(12) United States Patent
Ferry

(10) Patent No.: US 10,611,641 B2
(45) Date of Patent: Apr. 7, 2020

(54) HEMP-DERIVED DICARBOXYLIC ACID-FUNCTIONALIZED GRAPHENE

(71) Applicant: Dakota Zachariah Ferry, Shreveport, LA (US)

(72) Inventor: Dakota Zachariah Ferry, Shreveport, LA (US)

(73) Assignee: Dakota Zachariah Ferry, Shreveport, LA (US)

( * ) Notice: Subject to any disclaimer, the term of this patent is extended or adjusted under 35 U.S.C. 154(b) by 0 days.

(21) Appl. No.: 15/727,574

(22) Filed: Oct. 7, 2017

(65) Prior Publication Data
US 2019/0248655 A1 Aug. 15, 2019

(51) Int. Cl.
*C01B 32/184* (2017.01)

(52) U.S. Cl.
CPC ........ *C01B 32/184* (2017.08); *C01B 2204/00* (2013.01); *C01P 2002/82* (2013.01); *C01P 2004/03* (2013.01); *C01P 2004/20* (2013.01)

(58) Field of Classification Search
CPC . C01B 32/184; C01B 2204/00; C01B 32/182; C01B 32/198; C01B 2204/02; C01B 2204/04; C01B 2204/06; C01B 2204/065; C01B 2204/20; C01B 2204/22; C01B 2204/24; C01B 2204/26; C01B 2204/28; C01B 2204/30; C01B 2204/32; C01B 32/20; C01B 32/205; C01B 32/21; C01B 32/215; C01B 32/22; C01B 32/225; C01B 32/23; C01P 2004/03; C01P 2004/20; C01P 2002/82
See application file for complete search history.

(56) References Cited

U.S. PATENT DOCUMENTS

| | | | | |
|---|---|---|---|---|
| 9,145,302 B2* | 9/2015 | Choi | ...... | B82Y 30/00 |
| 9,162,894 B2* | 10/2015 | Liu | ...... | B82Y 40/00 |
| 9,162,895 B2* | 10/2015 | Lee | ...... | B82Y 30/00 |
| 9,656,871 B2* | 5/2017 | Jeon | ...... | C01B 32/20 |
| 2013/0018204 A1* | 1/2013 | Jeon | ...... | C01B 32/20 |
| | | | | 562/89 |
| 2014/0328006 A1* | 11/2014 | Mitlin | ...... | H01G 11/36 |
| | | | | 361/502 |
| 2018/0000857 A1* | 1/2018 | Kotra | ...... | A61K 36/185 |

OTHER PUBLICATIONS

Lewis, et al., Chemical Profiling of Medical Cannabis Extracts, ACS Omega 2017; 2: 6091-6103 (Year: 2017).*
Sun, et al., Hemp-derived activated carbons for supercapacitors, Carbon 2016; 103: 181-192 (Year: 2016).*
Wang, et al., Interconnected Carbon Nanosheets Derived from Hemp for Ultrafast Supercapacitors with High Energy, ACS Nano 2013; 7(6): 5131-5141 (Year: 2013).*
Jeon, et al., Edge-carboxylated graphene nanosheets via ball milling, PNAS 2012; 109(15): 5588-5593 (Year: 2012).*
Chhabra, et al., Functionalization of Graphene using Carboxylation process, International Journal for Science and Emerging Technologies with Latest Trends 2012; 4(1): 13-19 (Year: 2012).*

* cited by examiner

*Primary Examiner* — Daniel C. McCracken

(57) ABSTRACT

This invention pertains to the production of the bi-dimensional crystalline structure of carbon known as graphene. The purpose of this invention is to provide an aqueous, organic method for producing the atomic-scale substance. The invention is declared to enable the low-cost scalable production of large quantities of graphene.

12 Claims, 2 Drawing Sheets

Hemp-derived Dicarboxylic Acid-Functionalized Graphene
Appendix A: Images
Raman Spectrum of Graphene Sample

Hemp-derived Dicarboxylic Acid-Functionalized Graphene
Appendix A:
Images
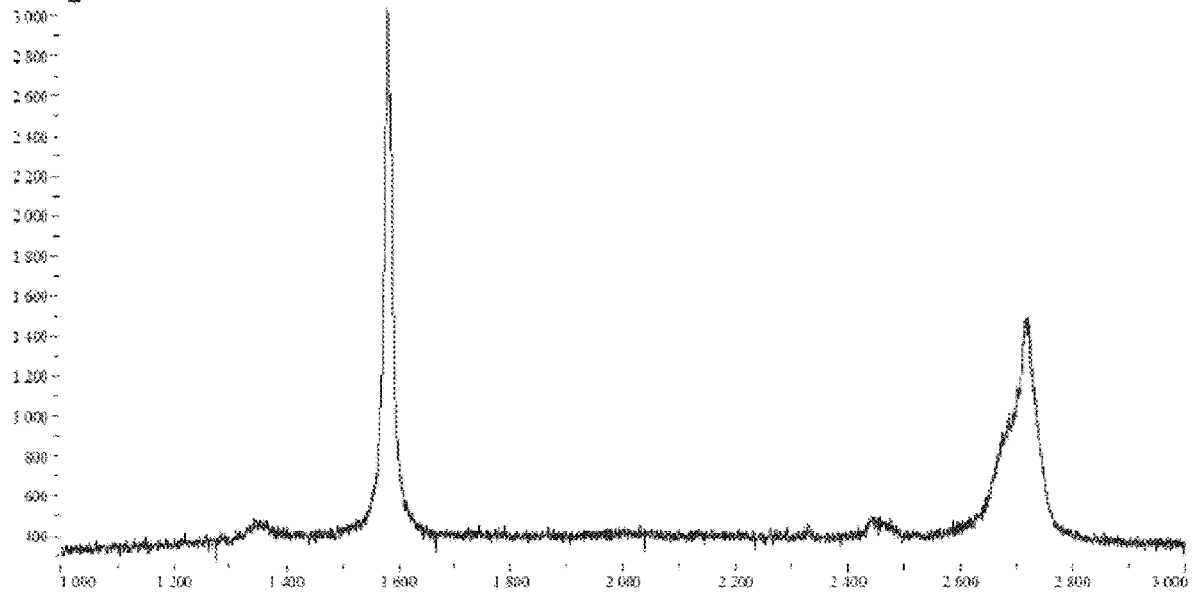
Figure 1: Raman Spectrum of Graphene Sample
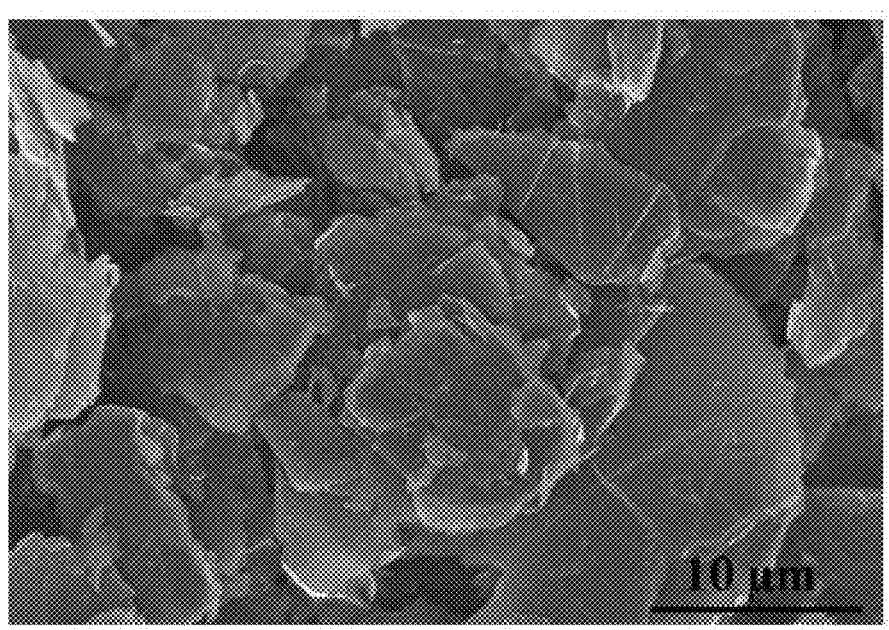
Figure 2: Scanning Electron Microscopy of Graphene Sample

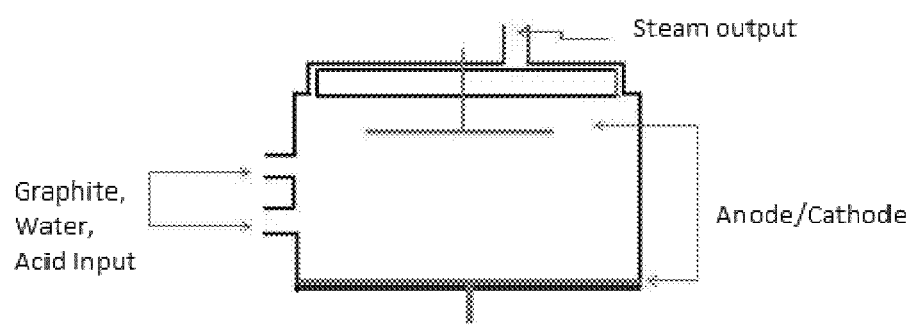
Figure 3: Steam Crystallizer

HEMP-DERIVED DICARBOXYLIC ACID-FUNCTIONALIZED GRAPHENE

BACKGROUND OF THE INVENTION

1. Field of the Invention

This invention pertains to synthesis, schemes and methods for producing low-cost manufacture of graphene sheets.

2. Description of Related Art

Graphene is electrically and thermally conductive and has comparatively high fracture strength, Young's modulus and functional surface area. These properties make graphene a good candidate for use in such applications as ceramic/metal/polymer alloys/composites, agricultural technology, bio-engineering, chemical synthesis, decontamination, desalination, energy storage, information/matter storage, medicine, chemo/photo sensors, micro- & nano-electronics, batteries, sensors, and hydrogen storage. Current methods of creating graphene that require bulk graphite crystals, complicated methods or expensive substrates; making the large-scale production of graphene by these methods expensive. Further, graphene sheets produced by these methods may have structural imperfections, variable thicknesses, and oxygen functionalities that may negatively influence the properties of the graphene that is produced.

Accordingly, there is a need for a method for reliably producing large-scale quantities of functionalized graphene that is inexpensive and easy to accomplish. The present invention satisfies these needs as well as others and is generally an improvement over the art.

BRIEF SUMMARY OF THE INVENTION

Functionalized graphene sheets produced by prior methods are costly and expensive. In contrast, the apparatus and methods of the present invention produce graphene sheets with fewer steps and lower cost than current techniques in the art. The method is capable of spontaneous synthesis of functionalized graphene with relatively few materials. Graphene sheets are created by mixing carbon, water and dicarboxylic acid together. First, an aqueous solution of water and dicarboxylic acid is prepared. Carbon is added to the aqueous solution and the dicarboxylic acid present within the aqueous solution will react with the carbon to create the aromatic fullerene. The fullerene assembles itself into stacks or piles to form graphite crystals. The aqueous solution is then evaporated or sieved out to isolate the crystals.

BRIEF DESCRIPTION OF THE SEVERAL VIEWS OF THE DRAWING(S)

FIG. 1 shows the Raman spectrum of graphene prepared using the method declared. The most notable features are the G peak at 1580 $cm^{-1}$ and G' peak at 2700 $cm^{-1}$. The higher G peak speaks to the presence of multiple layers of graphene. There is also a noticeable D peak at 1350 $cm^{-1}$ which hints at the presence of residual substances from the synthesis method.

FIG. 2 presents an image of a graphene sample produced according to the invention. The image was obtained using Scanning Electron Microscopy (SEM). Multiple layers of graphene can be observed at a scale of 10 micrometers.

FIG. 3 is a schematic drawing of a steam crystallizer for producing graphene according to the invention by providing energy for the reaction to take place between graphite & the dicarboxylic acid to form a functionalized graphene lattice. As the water is heated, it will evaporate.

DETAILED DESCRIPTION OF THE INVENTION

The present invention provides a method for a low-cost aqueous solution-based synthesis of graphene sheets. This method is capable of spontaneous graphene production in ambient conditions. The technique generally involves creating a structure of carbon with dicarboxylic acid {2-C(O)OH}, and water. Cannabinoids occur in the hemp plant *Cannabis sativa* in the form of their carboxyl derivatives, the phytocannabinoids. The reaction that produces cannabinoid dicarboxylic acids as a rule proceeds slowly at room temperature but can be accelerated by heating and/or addition of catalysts so that the 2-CO(O)H separation proceeds within a few minutes or practically immediately. This reaction can be controlled so that it proceeds practically quantitatively and without formation of further side products. Combining the hemp and water in a reactor accelerates the decarboxylation as such. To begin the structure formation process, the 2-C(O)OH and carbon must be combined in water. Carbon can be added in several forms to create a relatively pure graphene structure. At this point the carbon will begin to spontaneously react with the 2-C(O)OH forming into its' two-dimensional crystalline structure. The graphene may then be extracted from the water. Heating the water will evaporate the water and lock the graphene down into multiple layers of a single graphite structure, as if this is not performed water will remain trapped between the layers of graphene.

What is claimed is:

1. A method of functionalizing graphene comprising:
    deriving dicarboxylic acid from hemp,
    combining the dicarboxylic acid with carbon to form a mixture, and
    recovering the functionalized graphene.

2. The method according to claim 1, wherein the dicarboxylic acid is derived by decarboxylating phytocannabinoids within the hemp at ambient conditions or within a reactor.

3. The method according to claim 2, wherein the mixture is energized within a reactor.

4. The method according to claim 1, wherein the hemp is *Cannabis sativa*.

5. The method according to claim 1, wherein the carbon is crystalline.

6. A method of synthesizing graphene comprising mixing carboxylic acids attached to cannabinoids, water, and carbon to form a mixture, and
    decarboxylating the carboxylic acids to produce graphene.

7. The method of claim 6, further comprising heating the mixture of carboxylic acids attached to cannabinoids, water, and carbon.

8. The method of claim 6, further comprising adding a catalyst to the mixture of carboxylic acids attached to cannabinoids, water, and carbon.

9. The method of claim 6, further comprising recovering the graphene.

10. The method of claim 6, wherein the carboxylic acids attached to cannabinoids are prepared by mixing a hemp plant and water.

11. The method of claim 10, wherein the hemp plant and water are mixed in a steam reactor.

12. The method of claim 11, wherein the hemp is *Cannabis sativa*.

\* \* \* \* \*